(12) United States Patent
Paterson et al.

(10) Patent No.: US 7,585,344 B2
(45) Date of Patent: Sep. 8, 2009

(54) AIR CLEANER AIRFLOW SHAPER

(75) Inventors: Christopher M. Paterson, Biloxi, MS (US); Charles W. Reynolds, Long Beach, MS (US); Paul A. Moshenrose, Ocean Springs, MS (US)

(73) Assignee: Oreck Holdings, LLC, Cheyenne, WY (US)

( * ) Notice: Subject to any disclaimer, the term of this patent is extended or adjusted under 35 U.S.C. 154(b) by 543 days.

(21) Appl. No.: 11/351,189

(22) Filed: Feb. 9, 2006

(65) Prior Publication Data

US 2007/0180801 A1 Aug. 9, 2007

(51) Int. Cl.
*B01D 46/00* (2006.01)

(52) U.S. Cl. .............................. 55/413; 55/414; 55/418; 55/471; 55/472

(58) Field of Classification Search .................. 55/410, 55/413–416, 418, 467, 471, 472
See application file for complete search history.

(56) References Cited

U.S. PATENT DOCUMENTS

| | | | | |
|---|---|---|---|---|
| 3,668,840 A * | 6/1972 | Pierick | ........................ | 96/331 |
| 4,473,382 A | 9/1984 | Cheslock | | |
| 4,639,260 A * | 1/1987 | Borow | ........................ | 55/302 |
| 5,660,605 A * | 8/1997 | Chan et al. | ..................... | 96/19 |
| 5,972,215 A * | 10/1999 | Kammel | ..................... | 210/243 |
| 6,168,517 B1 * | 1/2001 | Cook | ......................... | 454/269 |
| 6,616,722 B1 * | 9/2003 | Cartellone | ................. | 55/459.3 |
| 6,797,042 B2 * | 9/2004 | LaFerriere et al. | ............. | 95/273 |
| 6,939,397 B2 * | 9/2005 | Nelsen et al. | ................. | 96/224 |
| 7,025,798 B2 * | 4/2006 | Endo | ......................... | 55/385.1 |
| 7,309,386 B2 * | 12/2007 | Wu et al. | ....................... | 96/70 |
| 7,316,729 B2 * | 1/2008 | Paterson et al. | ................ | 95/69 |
| 2001/0029728 A1 * | 10/2001 | Massey et al. | ................ | 55/471 |
| 2002/0129706 A1 * | 9/2002 | Cartellone | .................. | 95/268 |
| 2004/0020363 A1 * | 2/2004 | LaFerriere et al. | ............ | 95/273 |
| 2004/0118094 A1 * | 6/2004 | Hirayama et al. | ............. | 55/472 |
| 2004/0168416 A1 * | 9/2004 | Huehn et al. | ................. | 55/471 |
| 2005/0204918 A1 * | 9/2005 | Brown | ......................... | 95/273 |
| 2006/0053758 A1 * | 3/2006 | Wu et al. | ...................... | 55/471 |
| 2006/0185333 A1 * | 8/2006 | Huehn et al. | ................. | 55/471 |
| 2006/0248866 A1 * | 11/2006 | DeRosa et al. | ................ | 55/471 |

\* cited by examiner

*Primary Examiner*—Duane Smith
*Assistant Examiner*—Dung Bui
(74) *Attorney, Agent, or Firm*—Winston & Strawn LLP; Richard P. Gilly

(57) ABSTRACT

An airflow shaper for use in an air cleaner is provided according to an embodiment of the invention. The airflow shaper includes a body including a substantially central axis and a raised central region formed on the body. The raised central region transitions an impinging axial airflow into a substantially radial airflow or transitions an impinging radial airflow into a substantially axial airflow.

14 Claims, 10 Drawing Sheets

SECTION CC

SECTION CC

AIR CLEANER AIRFLOW SHAPER

TECHNICAL FIELD

The present invention relates to an air cleaner, and more particularly, to an air cleaner airflow shaper.

BACKGROUND OF THE INVENTION

Air cleaners and purifiers are widely used for removing foreign substances from the air. The foreign substances can include pollen, dander, smoke, pollutants, dust, etc. In addition, an air cleaner can be used to circulate room air. An air cleaner can be used in many settings, including at home, in offices, etc.

One type of air cleaner is an electrostatic precipitator. An electrostatic precipitator operates by creating an electrical field. Dirt and debris in the air becomes ionized when it is brought into the electrical field by an airflow. Charged positive and negative electrodes in the electrostatic precipitator air cleaner, such as positive and negative plates, attract the ionized dirt and debris. The electrodes can release the dirt and debris when not powered, and the electrostatic precipitator can be removed and cleaned. Because the electrostatic precipitator comprises electrodes or plates through which airflow can easily and quickly pass, only a low amount of energy is required to generate the airflow. As a result, foreign objects in the air can be efficiently and effectively removed without the need for a mechanical filter element.

In the prior art, typically air cleaners are manufactured in a square or cylindrical shape. Such a shape is the easiest and most obvious shape for accommodating a rotating fan unit and rectangular filter elements.

The prior art has several drawbacks. A squarish or cylindrical prior art air cleaner has a relatively large floor footprint for the available air volume and cleaning capacity. The prior art air cleaner is unidirectional, and has to be properly positioned to avoid blocking of inlet and outlet airflow. The prior art tower air cleaner does not uniformly clean or circulate the surrounding room air. A prior art tower air cleaner comprises a squarish or cylindrical air cleaner positioned in a tower structure, wherein an airflow travels laterally and strictly horizontally through the prior art tower air cleaner. A prior art tower air cleaner therefore has a limited air volume capacity and a limited air cleaning capacity.

SUMMARY OF THE INVENTION

An airflow shaper adapted for use in an air cleaner is provided according to an embodiment of the invention. The airflow shaper comprises a body including a substantially central axis and a raised central region formed on the body. The raised central region transitions an impinging axial airflow into a substantially radial airflow or transitions an impinging radial airflow into a substantially axial airflow.

An airflow shaper adapted for use in an air cleaner is provided according to an embodiment of the invention. The airflow shaper comprises a body including a substantially central axis and a raised central region formed on the body. The raised central region is substantially cylindrical. The raised central region transitions an impinging axial airflow into a substantially radial airflow or transitions an impinging radial airflow into a substantially axial airflow.

A tower air cleaner is provided according to an embodiment of the invention. The tower air cleaner comprises a base portion, a tower portion extending substantially vertically above the base portion, an air inlet extending at least partially around a first circumference of the tower portion, an air outlet, an air duct connecting the air inlet to the air outlet and including an inlet end and an outlet end, and at least one airflow shaper positioned in the air duct. The airflow shaper transitions airflow in the tower air cleaner between a substantially vertical airflow and an airflow at an angle less than vertical.

BRIEF DESCRIPTION OF THE DRAWINGS

The same reference number represents the same element on all drawings. It should be noted that the drawings are not necessarily to scale.

DETAILED DESCRIPTION OF THE INVENTION

FIGS. 1-8 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
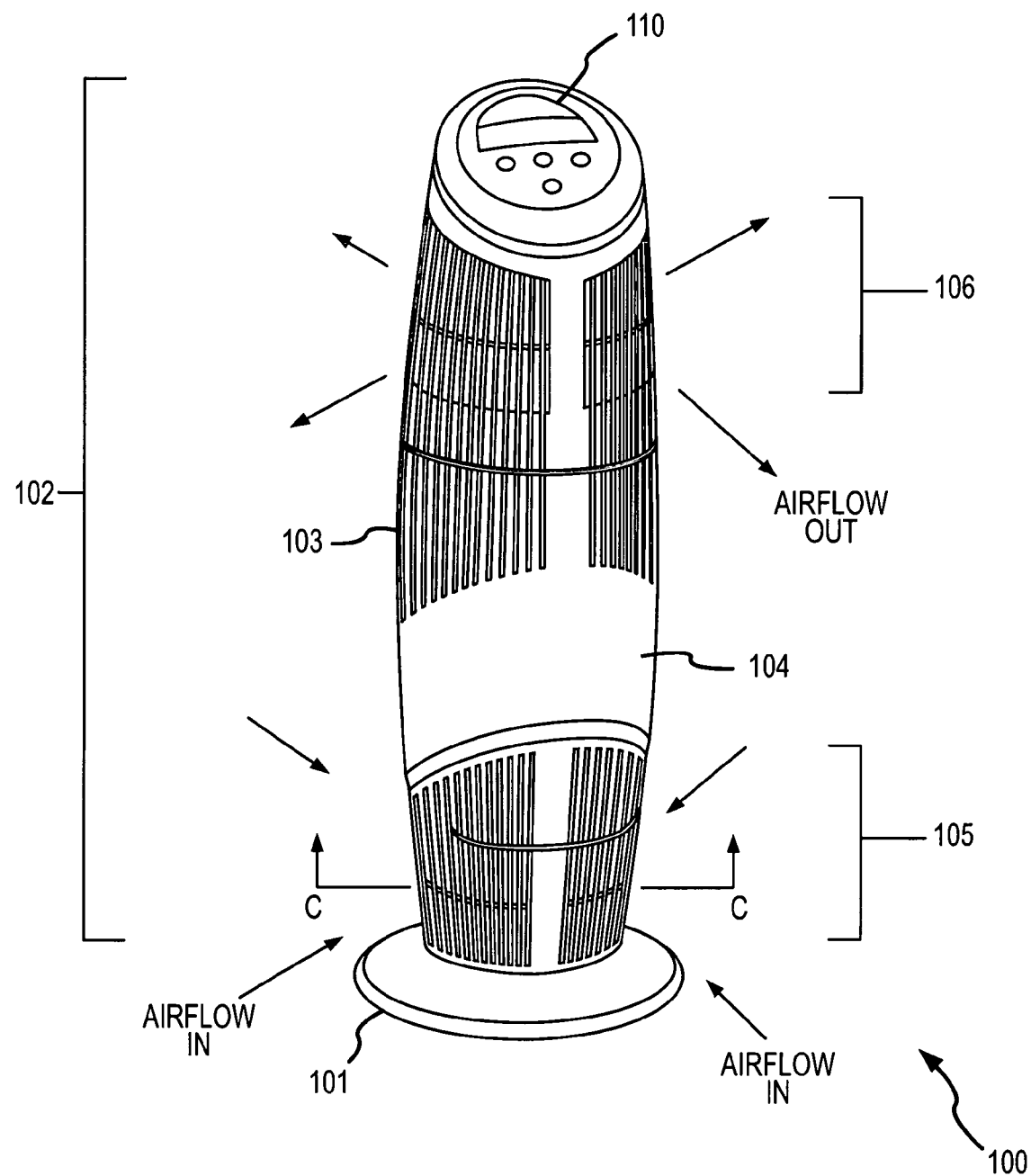
FIG. 1 shows a tower air cleaner according to an embodiment of the invention.

FIG. 1 shows a tower air cleaner 100 according to an embodiment of the invention. The air cleaner 100 includes a base portion 101 and a tower portion 102. The tower portion 102 can be generally vertically positioned and elongate in shape. In one embodiment, the tower portion 102 can be substantially cylindrical in shape. The tower portion 102 includes a shell 103, one or more doors 104, and a control panel 110. The tower portion 102 further includes an air inlet 105 and an air outlet 106. Air is drawn in through the air inlet 105, is cleaned inside the tower portion 102, and the cleaned air is exhausted from the air outlet 106.

In one embodiment, the air outlet 106 is vertically spaced apart from the air inlet 105. Although the airflow apertures of the air inlet 105 and the air outlet 106 are shown as comprising vertically oriented apertures, it should be understood that the apertures can be horizontally oriented or can be oriented in any direction. Consequently, airflow travels substantially vertically through the tower air cleaner 100 when traveling from the air inlet 105 to the air outlet 106. In one embodiment, one or more filter elements are positioned between the air inlet 105 and the air outlet 106. As a result, an airflow traveling from the air inlet 105 to the air outlet 106 passes through the one or more filter elements (see FIG. 2).

The air inlet 105 is shown as being at the lower end of the tower portion 102. However, it should be understood that alternatively the relative positions of the air inlet 105 and the air outlet 106 could be swapped.

The figure shows the incoming airflow traveling into the air inlet 105 and the exhausted cleaned airflow traveling out of the air outlet 106. As can be seen from the figure, the inlet airflow traveling into the air inlet 105 is traveling substantially radially and therefore substantially horizontally. Likewise, the outlet airflow traveling out of the air outlet 106 can travel substantially radially and therefore substantially horizontally. Alternatively, the airflow can travel at an angle to the horizontal, i.e., the airflow can travel at an at least partially upward angle.

In one embodiment, an inlet airflow traveling into the air inlet 105 is admitted around substantially 360 degrees of the tower portion 102. In one embodiment, an outlet airflow traveling out of the air outlet 106 is exhausted around substantially 360 degrees of the tower portion 102. Because of this feature, the tower air cleaner 100 can be placed in any location in a room and will still function effectively. As a result, the orientation of the tower air cleaner 100 is immaterial, as the tower air cleaner 100 will not need to be turned or positioned in a certain orientation in order to properly drawn in and exhaust the airflow. In addition, the 360 degree airflow feature makes the tower air cleaner 100 non-susceptible to blocking by nearby objects, walls, etc. Further, the 360 degree airflow feature provides a larger inlet and outlet area, reducing the amount of energy needed to maintain the airflow and reducing noise generated by the tower air cleaner 100.

Figure 2:
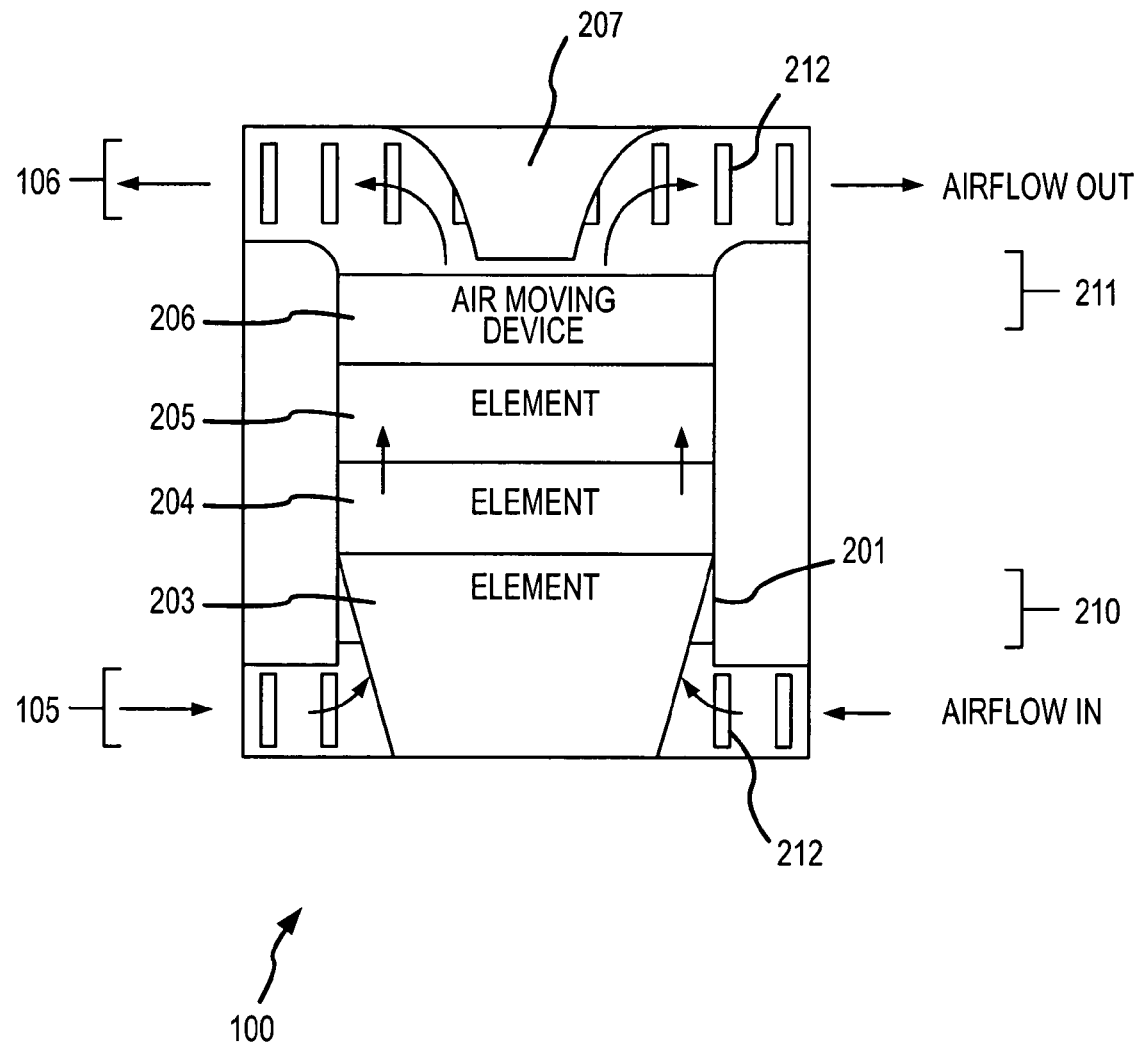
FIG. 2 shows internal components of the air cleaner according to an embodiment of the invention.

FIG. 2 shows internal components of the air cleaner 100 according to an embodiment of the invention. Elements in common with other figures share reference numbers. The figure shows internal detail of the airflow path of the tower air cleaner 100. The tower air cleaner includes an air duct 201 connecting the air inlet 105 to the air outlet 106. The air duct 201 includes an inlet end 210 located adjacent to the air inlet 105 and includes an outlet end 211 located adjacent to the air outlet 106. The air duct 201 in one embodiment can accommodate components of the tower air cleaner 100. For example, the air duct 201 can accommodate a filter element 203, a filter element 204, a filter element 205, and an air moving device 206 (such as a fan unit, for example). The various filter elements 203, 204, and 205 can comprise any type of device or apparatus that removes impurities from the air or that otherwise clean the air or add desirable properties or attributes to the air. For example, the various filter elements 203, 204, and 205 can physically filter dirt and debris from the airflow. In some embodiments, the filter elements 203, 204, and 205 can remove odors from the airflow. In some embodiments, the filter elements 203, 204, and 205 can remove Volatile Organic Chemicals (VOCs) from the airflow. In some embodiments, the filter elements 203, 204, and 205 can remove ozone from the airflow. In some embodiments, the filter elements 203, 204, and 205 can add fragrance or scent to the airflow.

It should be understood that various types, numbers, and configurations of filter elements can be employed. For example, the filter element 203 can comprise a pre-filter element and the filter element 205 can comprise a post-filter element.

In one embodiment, the filter element 204 can comprise an electrostatic precipitator 204. The electrostatic precipitator 204 can comprise an electrostatic precipitator element. Alternatively, the electrostatic precipitator 204 can comprise an electrostatic precipitator element and a pre-ionizer, for example.

As can be seen from this figure, the air inlet 105 and the air outlet 106 in the embodiment shown comprise a plurality of airflow apertures 212 in the shell 103 of the tower portion 102. An airflow aperture 212 can comprise any desired aperture shape that allows airflow to pass through, such as a slot aperture (shown), circular, rectangular, irregular, etc.

The air duct 201 in one embodiment includes an airflow shaper 207 located at the air outlet end 211 of the air duct 201. The airflow shaper 207 smoothly transitions the substantially cleaned, substantially vertical airflow into an airflow at an angle less than vertical, such as a substantially horizontal exhaust airflow or an angled airflow between vertical and horizontal. The airflow shaper 207 accomplishes the transition with a minimum of airflow turbulence in order to minimize the energy needed to create and sustain the airflow and in order to minimize noise generated by the tower air cleaner 100.

Figure 3:
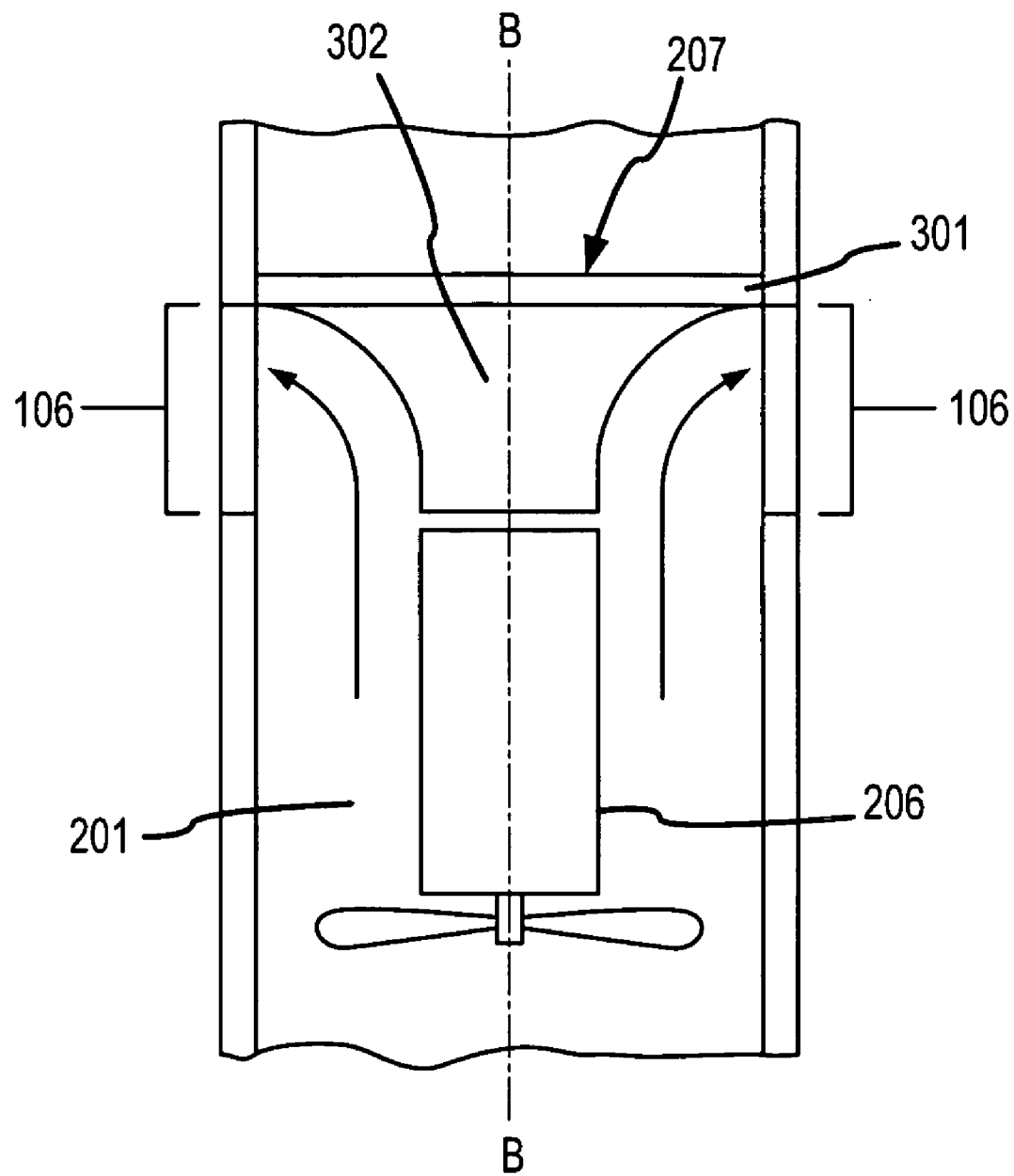
FIG. 3 shows an airflow shaper according to an embodiment of the invention.

FIG. 3 shows an airflow shaper 207 according to an embodiment of the invention. The airflow shaper 207 comprises a base 301 and a raised central region 302. The raised central region 302 in one embodiment is substantially symmetrically formed about a central axis BB. In one embodiment, the base 301 includes a radius R that corresponds to a cross-sectional shape of the air duct 201 (see FIG. 4B). Alternatively, in another embodiment the body 301 can be oval, rectangular, etc., and can include other features, such as mounting devices, etc.

Figure 4A:
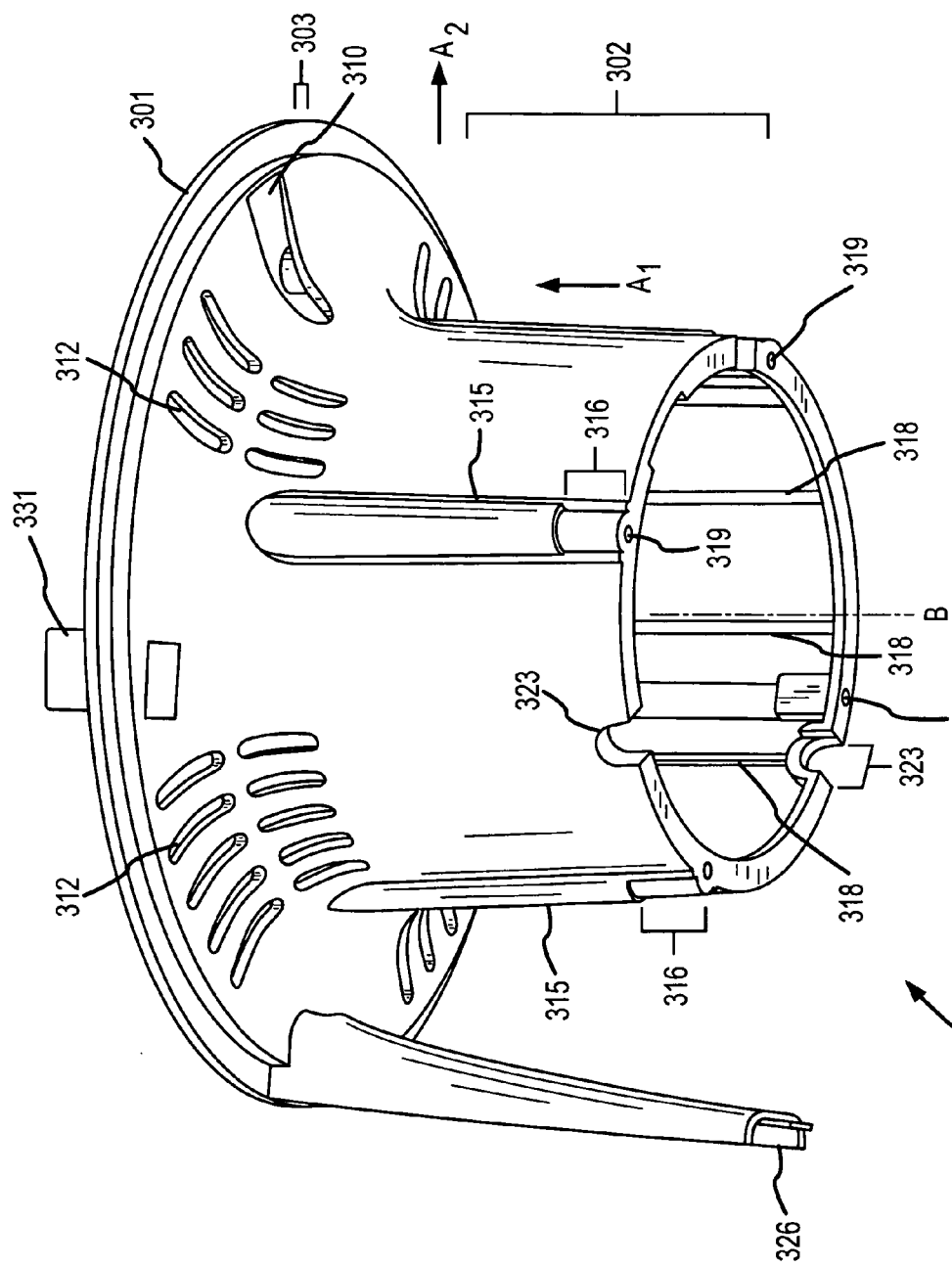
FIG. 4A shows the airflow shaper according to an embodiment of the invention.

In one embodiment, the airflow shaper 207 transitions from a large circular dimension to a smaller circular dimension, as shown (see also FIG. 4A). However, it should be understood that other shapes are contemplated for the airflow shaper 207 and are within the scope of the description and claims (for example, see FIGS. 4B-4C).

FIG. 4A shows the airflow shaper 207 according to an embodiment of the invention. In this embodiment, the raised central region 302 comprises curved sides ending in a substantially cylindrical shape. The raised central region 302 can transition an impinging axial airflow $A_1$ into a substantially radial airflow $A_2$ or impinging radial airflow $A_3$ into a substantially axial airflow $A_4$. This shape can reduce or eliminate recirculation of air above the air moving device 206. Consequently, the airflow shaper 207 can be used at the outlet end 211 of the air duct 201.

Figure 6:
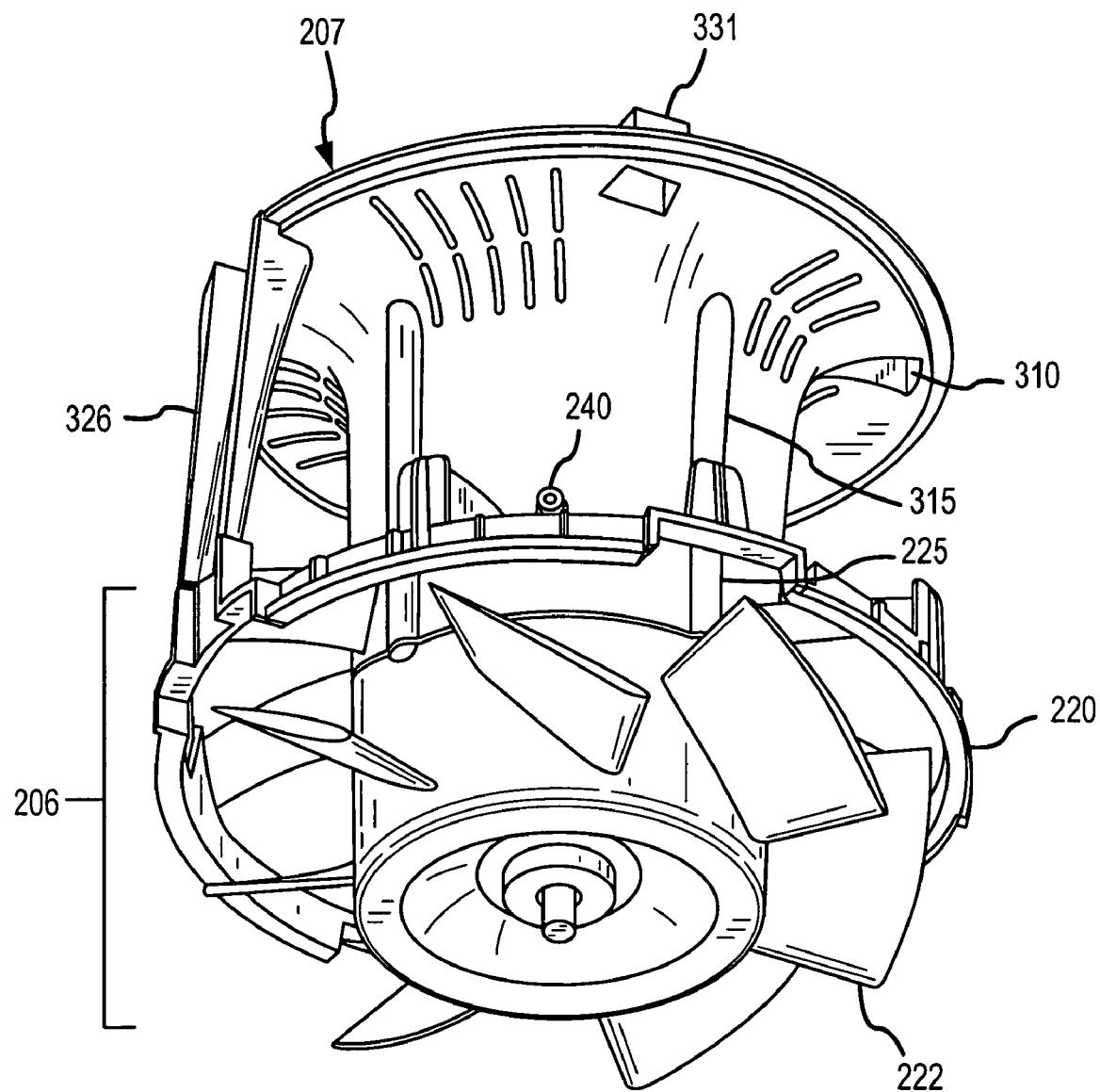
FIG. 6 shows the air moving unit mated to the airflow shaper according to an embodiment of the invention.
Figure 7:
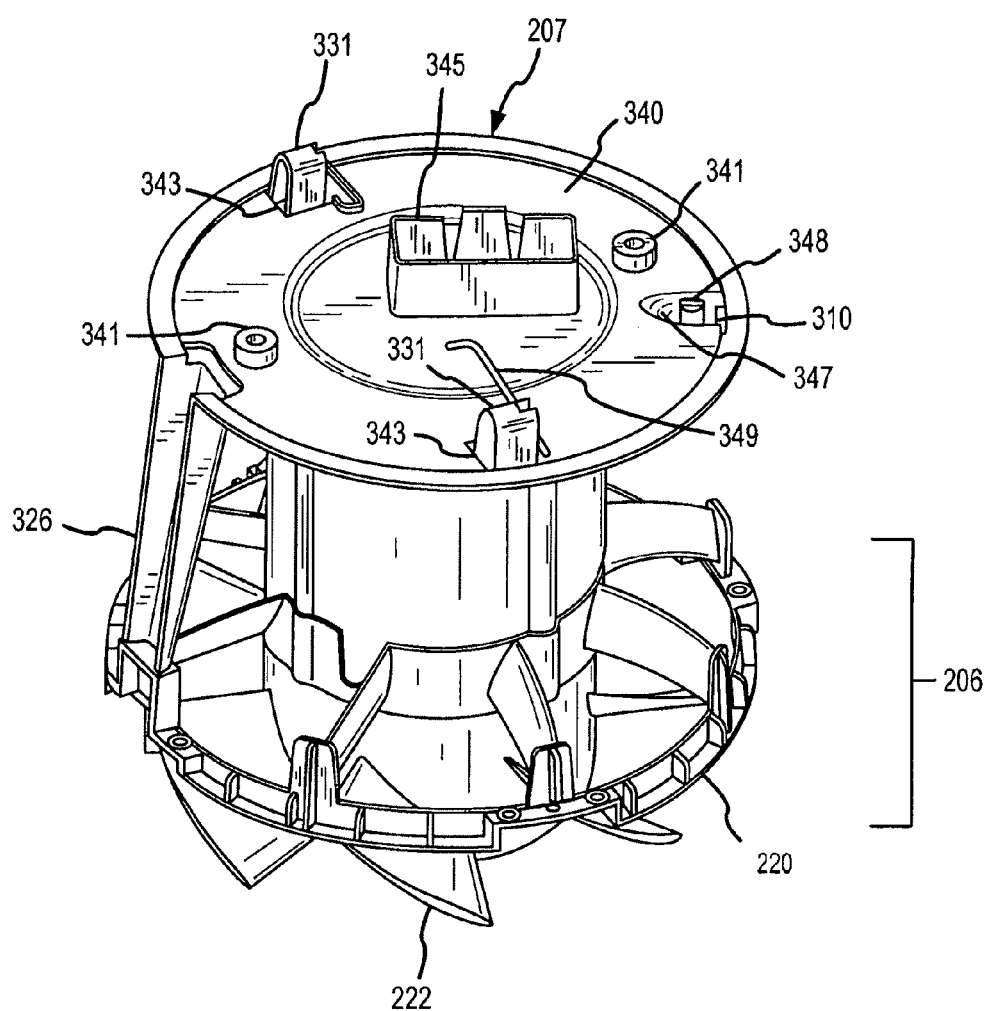
FIG. 7 shows the combined airflow shaper and air moving unit from above.

The raised central region 302 can substantially match up to the air moving device 206 (see FIGS. 6-7). The raised central region 302 therefore substantially matches an exterior profile of the air moving device 206. In addition, the transition of the outer surface of the airflow shaper 207 to a corresponding outer surface of a motor or motor mount ring 220 is substantially smooth and uninterrupted. As a result, the transition between components generates a minimum of disruption in the airflow.

The airflow shaper 207 can include a flange 303 that interacts with and fits to a frame portion. As a result, in some embodiments the flange 303 operates to hold the airflow shaper 207 in place.

The airflow shaper 207 can include an ionizer cut-out 310. The ionizer cut-out 310 receives an ionizer element (not shown). The ionizer cut-out 310 is further shown and discussed in FIG. 7.

The airflow shaper 207 can include a plurality of vent apertures 312. The vent apertures 312 can permit a cooling airflow to pass through the airflow shaper 207, such as for the motor of the air moving device 206.

The airflow shaper 207 can include outer projections 315. The outer projections 315 can comprise ribs or other projections that extend axially along an outer surface of the raised central region 302. The outer projections 315 can provide a stiffening effect to the raised central region 302. The outer projections 315 can provide a stop against which a motor mount ring 220 can rest (see FIGS. 6-7). Consequently, the outer projections 315 can include mount ring gaps 316 that allow the motor mount ring 220 to slip over the corresponding bottom portion of the raised central region 302. Further, the outer projections 315 can act like vanes and can provide at least a small straightening effect to airflow from the air moving unit 206.

The airflow shaper 207 can include inner projections 318. The inner projections 318 can comprise ribs or other projections that extend axially along an inner surface of the raised central region 302. The inner projections 318 can provide a stiffening effect to the airflow shaper 207.

The airflow shaper 207 can include fastener apertures 319. The fastener apertures 319 can receive any manner of fasteners. The fastener apertures 319 enable the motor or the motor mount ring 220 to be attached to the airflow shaper 207.

The airflow shaper 207 can include cut-outs 323. The cut-outs 323 are formed in a bottom edge of the raised central region 302. The cut-outs 323 can mate with corresponding features of the motor or the motor mount ring 220, for example. Alternatively, the cut-outs 323 can receive any manner of motor mount feature/fastener system 240 that affixes the motor mount ring 220 to the motor (see FIG. 6).

The airflow shaper 207 can include a wiring channel 326. The wiring channel 326 can fit to an interior surface of the shell 103 of the air cleaner 100. Any manner of wires or wiring harnesses can extend through the wiring channel 326.

Figure 4B:
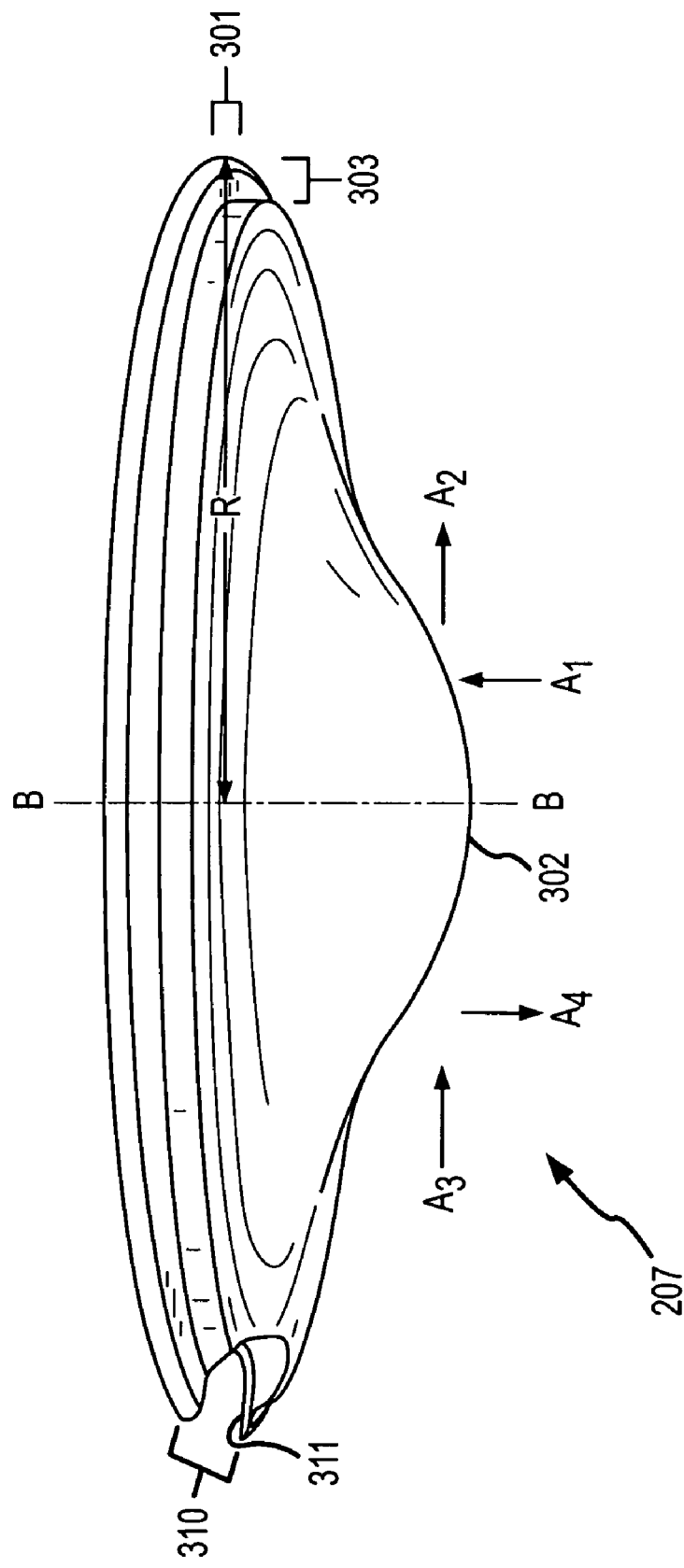
FIG. 4B shows an alternative airflow shaper according to an embodiment of the invention.

FIG. 4B shows an alternative airflow shaper 207 according to an embodiment of the invention. In the embodiment of FIG. 4B, the raised central region 302 comprises a rounded, blended, or rounded and blended conical shape that is formed on the base 301. The raised central region 302 can comprise a substantially bell curve shape in cross-section.

Figure 4C:
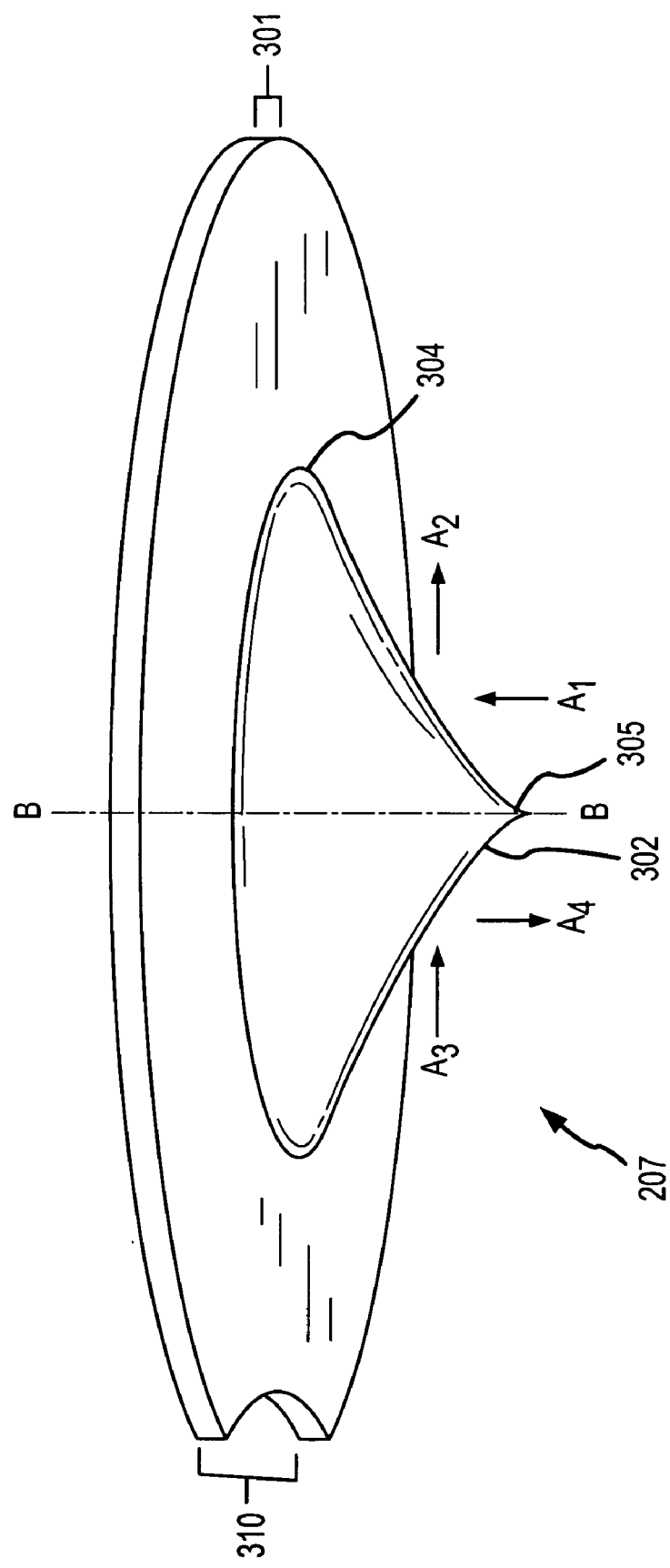
FIG. 4C shows another alternative airflow shaper according to an embodiment of the invention.

FIG. 4C shows another alternative airflow shaper 207 according to an embodiment of the invention. In the embodiment of FIG. 4C, the raised central region 302 comprises a substantially curved conical shape formed on the base 301, including a sharp transition region 304 and an apex 305. This shape can keep all airflow velocities substantially equal as they are transitioned by the airflow shaper 207. Alternatively, the raised central region 302 can comprise any manner of curves and straight lines, including a rounded transition region 304, a rounded apex 305, etc.

Figure 5:
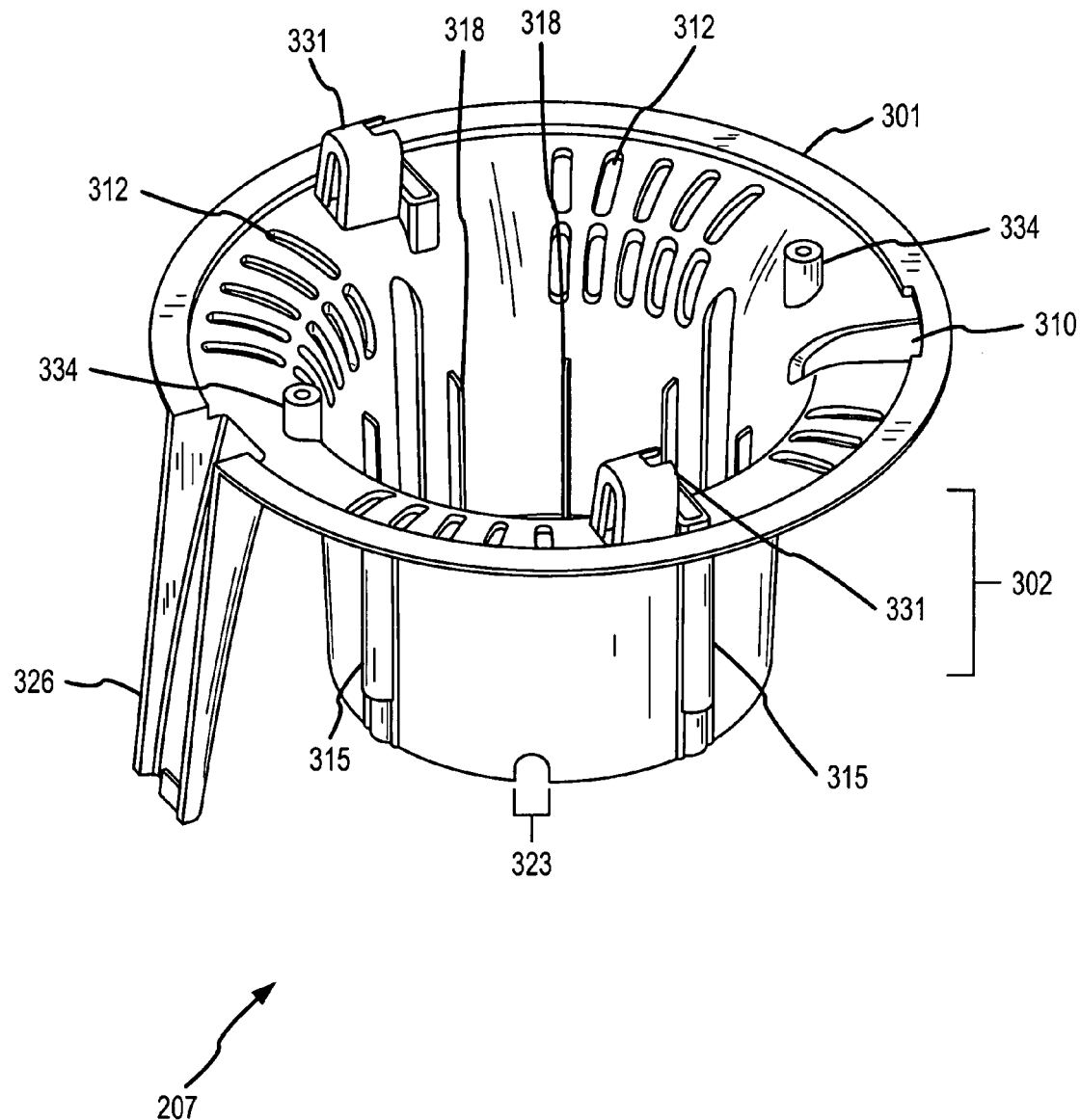
FIG. 5 is another view of the airflow shaper of FIG. 4A.

FIG. 5 is another view of the airflow shaper of FIG. 4A. The airflow shaper 207 additionally includes two or more fastener stand-offs 334 and two or more attachment features 331. The top region of the airflow shaper 207 can receive a cap 340 (see FIG. 7). The cap 340 can be attached to the airflow shaper 207 by two or more fasteners that engage the two or more fastener stand-offs 334.

The two or more attachment features 331 can receive structural members that attach other air cleaner components to the airflow shaper 207. Therefore, the two or more attachment features 331 can receive any manner of fastener or fastener system. Alternatively, structural members can directly engage the two or more attachment features 331.

FIG. 6 shows the air moving unit 206 mated to the airflow shaper 207 according to an embodiment of the invention. The air moving unit 206 includes a motor (not visible), an impeller 222, and a motor mount ring 220. It can be seen from this figure that the airflow shaper 207 fits substantially smoothly and continuously to the air moving unit 206. As previously discussed, the motor mount ring 220 fits over a portion of the raised central region 302 of the airflow shaper 207. The motor mount ring 220 can include projections 225 that substantially match up with the outer projections 315 of the airflow shaper 207. In addition, the impeller 222 fits substantially smoothly and continuously to the motor mounting ring 220.

In the figure, one motor mounting feature 240 can be seen. The motor can include a plurality of motor mounting features 240. The motor mounting feature 240 extends from the motor and passes through the cut-out 323 of the airflow shaper 207. In one embodiment, the motor mounting feature 240 receives a fastener that affixes the motor to the airflow shaper 207.

FIG. 7 shows the combined airflow shaper 207 and air moving unit 206 from above. The airflow shaper 207 in one embodiment includes a cap 340. The cap 340 includes fastener features 341 that receive fasteners (not shown) which engage the fastener stand-offs 334 in the airflow shaper 207 (see FIG. 5). The cap 340 further includes attachment feature apertures 343 that receive the attachment features 331. The cap 340 further includes a motor wire slot 349 that enables motor wires to pass up through the airflow shaper 207, through the cap 340, and upwards to the control panel 110 (see FIG. 1).

The cap 340 further includes an ionizer receptacle 348 that receives and holds an ionizer element (not shown). The ionizer receptacle 348 in the embodiment shown includes a receptacle dimple 347. As a result, the ionizer element extends downward through the ionizer cut-out 310 of the airflow shaper 207 and into the airflow.

The cap 340 further includes an ionizer module receptacle 345 that receives an ionizer module (not shown). The ionizer module can comprise circuitry for powering the ionizer element, for example. The ionizer module can fit into the ionizer module receptacle 345 and is retained therein. Consequently, the ionizer module receptacle 345 can receive the ionizer module with a friction fit, can hold the ionizer module under a tab or other spring member, etc.

Figure 8A:
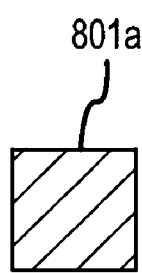
FIGS. 8A-8B show cross-sectional shapes of an airflow aperture bar of the airflow inlet and the airflow outlet.
Figure 8B:
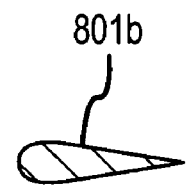

FIGS. 8A-8B show cross-sectional shapes of an airflow aperture bar 801 included in the airflow inlet 105 and the airflow outlet 106. The airflow inlet 105 and the airflow outlet 106 can each include a plurality of airflow apertures, such as slots, that are separated by a plurality of airflow aperture bars 801. The airflow aperture bar 801 is a sectional shape taken from the section view CC of FIG. 1.

In FIG. 8A, a conventional square or rectangular airflow aperture bar 801a is shown. This is typically an easy shape to manufacture, and is therefore a default shape in the prior art.

In FIG. 8B, an airfoil-shaped airflow aperture bar 801b is shown. The airfoil-shaped airflow aperture bar 801b presents less aerodynamic drag to both the inlet airflow and the outlet airflow. The airfoil-shaped airflow aperture bar 801b therefore creates less drag and increases the airflow velocity. In addition, the airfoil-shaped airflow aperture bar 801b can create less turbulence (and noise) in the airflow.

The tower air cleaner according the invention can be implemented according to any of the embodiments in order to obtain several advantages, if desired. The invention can provide an effective and efficient tower type air cleaner device. Advantageously, the footprint of the tower air cleaner is relatively small in relation to the air volume cleaning capacity, allowing for placement of a highly efficient air cleaner in a small space. In addition, the tower air cleaner admits and exhausts air substantially around a circumference of the tower portion. Because of this feature, the tower air cleaner can be placed in any location in a room and will function effectively. In addition, the orientation of the tower air cleaner is immaterial, as the tower air cleaner will not need to be turned or positioned in a certain orientation in order to properly drawn in and exhaust the airflow. The 360 degree airflow feature makes the tower air cleaner non-susceptible to blocking by nearby objects, walls, etc. In addition, the 360 degree airflow feature provides a larger inlet and outlet area, reducing the amount of energy needed to maintain the airflow and reducing noise generated by the tower air cleaner.

What is claimed is:

1. A tower air cleaner, comprising:
    a base portion;
    a tower portion extending substantially vertically above the base portion;
    an air inlet extending at least partially around a first circumference of the tower portion;
    an air outlet;
    an air duct connecting the air inlet to the air outlet and including an inlet end and an outlet end; and
    at least one airflow shaper with a substantially cylindrical raised central region positioned in the air duct, wherein the airflow shaper transitions airflow in the tower air cleaner between a substantially vertical airflow and an airflow at an angle less than vertical.

2. The tower air cleaner of claim 1, with the air duct extending substantially vertically in the tower portion and with the air inlet being vertically spaced apart from the air outlet.

3. The tower air cleaner of claim 1, with the at least one airflow shaper comprising an airflow shaper located at the outlet end of the air duct.

4. The tower air cleaner of claim 1, with the at least one airflow shaper comprising an airflow shaper located at the inlet end of the air duct.

5. The tower air cleaner of claim 1, with the at least one airflow shaper comprising a first airflow shaper located at the inlet end of the air duct and a second airflow shaper located at the outlet end of the air duct.

6. The tower air cleaner of claim 1, with an airflow shaper of the at least one airflow shaper comprising:
    a body including a substantially central axis; and
    a raised central region formed on the body, wherein the raised central region transitions an impinging axial airflow into a substantially radial airflow or transitions an impinging radial airflow into a substantially axial airflow.

7. The airflow shaper of claim 6, with the raised central region being substantially centered on the axis.

8. The airflow shaper of claim 6, with the raised central region being substantially hollow and substantially cylindrical.

9. The airflow shaper of claim 6, with the raised central region being substantially cylindrical and with the raised central region being adapted to substantially match an exterior profile of an air moving device.

10. The airflow shaper of claim 6, with the airflow shaper further comprising a plurality of vent apertures.

11. The airflow shaper of claim 6, with the airflow shaper further comprising an ionizer cut-out.

12. The airflow shaper of claim 6, with the airflow shaper further comprising a wiring channel.

13. A tower air cleaner, comprising:
    a base portion;
    a tower portion extending substantially vertically above the base portion;
    an air inlet extending at least partially around a first circumference of the tower portion;
    an air outlet;
    an air duct connecting the air inlet to the air outlet and including an inlet end and an outlet end; and
    at least two airflow shapers positioned in the air duct, wherein the at least two airflow shapers transition airflow in the tower air cleaner between a substantially vertical airflow and an airflow at an angle less than vertical.

14. A tower air cleaner, comprising:
    a base portion;
    a tower portion extending substantially vertically above the base portion;
    an air inlet extending at least partially around a first circumference of the tower portion;
    an air outlet;
    an air duct connecting the air inlet to the air outlet and including an inlet end and an outlet end; and
    at least one airflow shaper positioned in the air duct, wherein the airflow shaper comprises projections and transitions airflow in the tower air cleaner between a substantially vertical airflow and an airflow at an angle less than vertical.

* * * * *

UNITED STATES PATENT AND TRADEMARK OFFICE
CERTIFICATE OF CORRECTION

PATENT NO. : 7,585,344 B2
APPLICATION NO. : 11/351189
DATED : September 8, 2009
INVENTOR(S) : Paterson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 754 days.

Signed and Sealed this

Fourteenth Day of September, 2010

David J. Kappos
*Director of the United States Patent and Trademark Office*

(12) EX PARTE REEXAMINATION CERTIFICATE (10287th)
United States Patent
Paterson et al.

(10) Number: US 7,585,344 C1
(45) Certificate Issued: Sep. 3, 2014

(54) AIR CLEANER AIRFLOW SHAPER

(75) Inventors: Christopher M. Paterson, Biloxi, MS (US); Charles W. Reynolds, Long Beach, MS (US); Paul A. Moshenrose, Ocean Springs, MS (US)

(73) Assignee: Wells Fargo Bank, National Association, New York, NY (US)

Reexamination Request:
No. 90/012,644, Nov. 2, 2012

Reexamination Certificate for:
Patent No.: 7,585,344
Issued: Sep. 8, 2009
Appl. No.: 11/351,189
Filed: Feb. 9, 2006

Certificate of Correction issued Sep. 14, 2010

(51) Int. Cl.
*B01D 46/00* (2006.01)

(52) U.S. Cl.
USPC .................. 55/413; 55/414; 55/418; 55/471; 55/472

(58) Field of Classification Search
None
See application file for complete search history.

(56) References Cited

To view the complete listing of prior art documents cited during the proceeding for Reexamination Control Number 90/012,644, please refer to the USPTO's public Patent Application Information Retrieval (PAIR) system under the Display References tab.

*Primary Examiner* — Terrence Till

(57) ABSTRACT

An airflow shaper for use in an air cleaner is provided according to an embodiment of the invention. The airflow shaper includes a body including a substantially central axis and a raised central region formed on the body. The raised central region transitions an impinging axial airflow into a substantially radial airflow or transitions an impinging radial airflow into a substantially axial airflow.

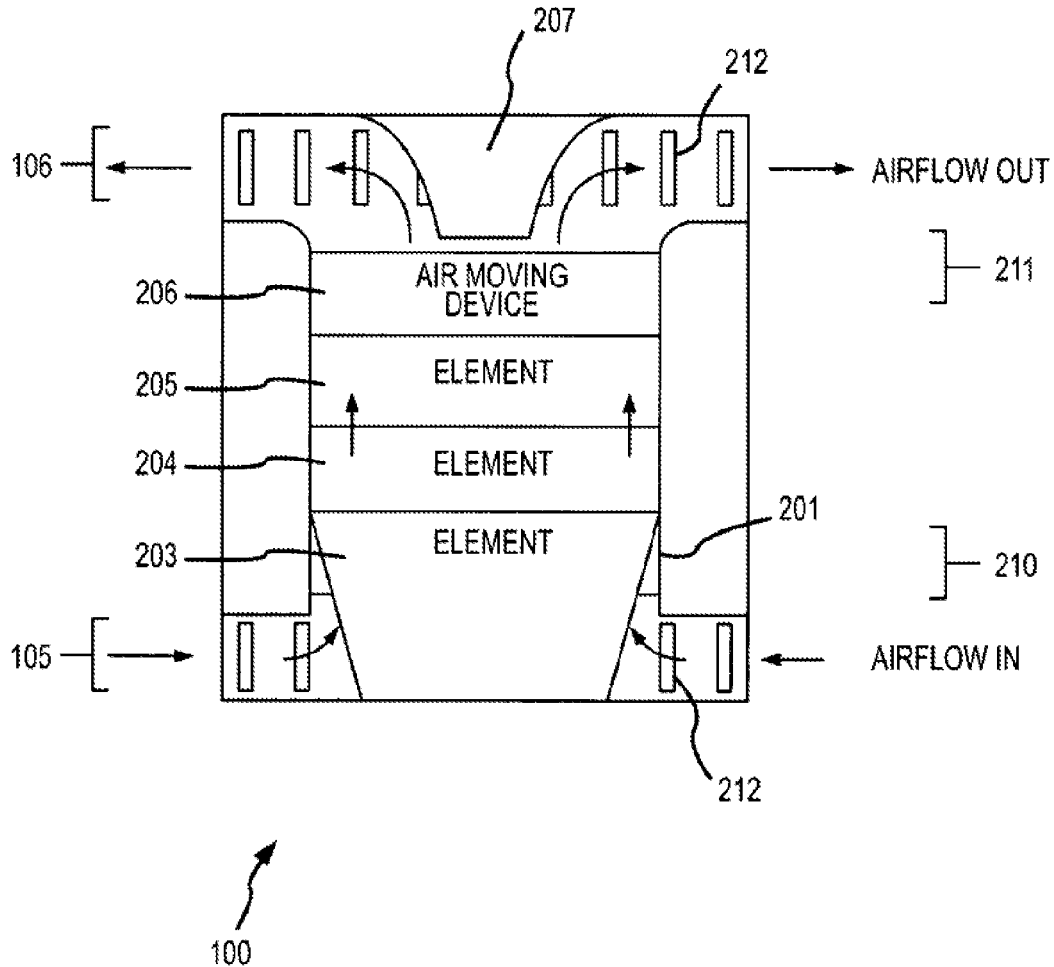

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11-13 is confirmed.

Claims 1-10 are cancelled.

Claim 14 is determined to be patentable as amended.

New claims 15-24 are added and determined to be patentable.

14. A tower air cleaner, comprising:
a base portion;
a tower portion extending substantially vertically above the base portion;
an air inlet extending at least partially around a first circumference of the tower portion;
an air outlet;
an air duct connecting the air inlet to the air outlet and including an inlet end and an outlet end; [and]
*an air mover;*
at least one airflow shaper positioned in the air duct, wherein the airflow shaper comprises [projections] *a projection* and transitions airflow in the tower air cleaner between a substantially vertical airflow and an airflow at an angle less than [vertical.] *vertical; and*
*wherein the projection defines an aperture and provides a stop against which the air mover rests.*

*15. A tower air cleaner, comprising:*
*a base portion;*
*a tower portion extending substantially vertically above the base portion, the tower portion including a shell having a first end and a second end opposite the first end;*
*an air inlet;*
*an air outlet;*
*an air duct at least partially defined by the shell, the air duct extending between the air inlet and the air outlet;*
*at least one airflow shaper positioned within the air duct proximate at least one of the air inlet and the air outlet, wherein the airflow shaper transitions airflow in the tower air cleaner between a substantially vertical airflow and an airflow at an angle less than vertical; and*
*wherein at least one of the air inlet and the air outlet includes apertures defined by the shell.*

*16. The tower air cleaner of claim 15, wherein the shell is substantially cylindrical.*

*17. The tower air cleaner of claim 15, further comprising an air filter positioned within the air duct.*

*18. The tower air cleaner of claim 15, wherein the at least one of the air inlet and the air outlet includes one or more apertures defined by the shell proximate the first end of the shell, and wherein the other of the air outlet and the air inlet includes an aperture defined by the shell proximate the second end of the shell.*

*19. A tower air cleaner, comprising:*
*a base portion;*
*a tower portion extending substantially vertically above the base portion, the tower portion including a shell having a first end and a second end opposite the first end;*
*an air inlet defined by apertures formed in the shell proximate the first end;*
*an air outlet defined by apertures formed in the shell proximate the second end;*
*an air duct extending between the air inlet and the air outlet;*
*an air mover positioned within the air duct;*
*an air filter positioned within the air duct;*
*a first airflow shaper positioned within the air duct proximate the first end of the shell, wherein the airflow shaper transitions airflow in the tower air cleaner between a substantially vertical airflow and an airflow at an angle less than vertical; and*
*a second airflow shaper positioned within the air duct proximate the second end of the shell, wherein the airflow shaper transitions airflow in the tower air cleaner between a substantially vertical airflow and an airflow at an angle less than vertical.*

*20. The tower air cleaner of claim 1, further comprising an air filter positioned within the air duct.*

*21. The tower air cleaner of claim 20, further comprising an air mover positioned within the air duct downstream of the air filter.*

*22. The tower air cleaner of claim 1, wherein the airflow shaper includes a projection.*

*23. The tower air cleaner of claim 22, wherein the projection provides support to the central raised portion.*

*24. The tower air cleaner of claim 13, wherein the tower portion includes a shell, and wherein at least one of the air inlet and the air outlet includes apertures defined by the shell.*

* * * * *